(12) United States Patent
Stenvall et al.

(10) Patent No.: US 10,763,556 B2
(45) Date of Patent: Sep. 1, 2020

(54) VEHICLE BATTERY ASSEMBLY UTILIZING SIDE COOLING PLATES

(71) Applicant: Volvo Car Corporation, Göteborg (SE)

(72) Inventors: Lars Johan Stenvall, Ljungskile (SE); Patrik Larsson, Landvetter (SE); Klas Persson, Göteborg (SE); Björn Scherdin, Trollhättan (SE)

(73) Assignee: Volvo Car Corporation, Gothenburg (SE)

( * ) Notice: Subject to any disclaimer, the term of this patent is extended or adjusted under 35 U.S.C. 154(b) by 10 days.

(21) Appl. No.: 16/214,313

(22) Filed: Dec. 10, 2018

(65) Prior Publication Data

US 2020/0185796 A1 Jun. 11, 2020

(51) Int. Cl.
| | | |
|---|---|---|
| *H01M 10/613* | (2014.01) | |
| *H01M 10/625* | (2014.01) | |
| *H01M 10/6554* | (2014.01) | |
| *H01M 10/6556* | (2014.01) | |
| *B60K 1/04* | (2019.01) | |
| *B60L 58/26* | (2019.01) | |

(Continued)

(52) U.S. Cl.
CPC ............. *H01M 10/625* (2015.04); *B60K 1/04* (2013.01); *B60L 50/66* (2019.02); *B60L 58/26* (2019.02); *H01M 10/613* (2015.04); *H01M 10/6554* (2015.04); *H01M 10/6556* (2015.04); *B60K 6/28* (2013.01); *B60K 2001/0422* (2013.01); *B60K 2001/0427* (2013.01); *B60K 2001/0433* (2013.01); *B60Y 2200/91* (2013.01); *B60Y 2200/92* (2013.01); *B60Y 2306/05* (2013.01); *H01M 2220/20* (2013.01)

(58) Field of Classification Search
CPC .......................... H01M 10/613; H01M 10/625
See application file for complete search history.

(56) References Cited

U.S. PATENT DOCUMENTS

| 7,905,308 B2 | 3/2011 | Abe et al. |
| 8,042,637 B2 | 10/2011 | Nagata et al. |
| 8,835,039 B2 | 9/2014 | Teng et al. |

(Continued)

FOREIGN PATENT DOCUMENTS

| EP | 2337143 A2 | 6/2011 |
| EP | 2980913 A1 | 2/2016 |
| WO | 2014109034 A1 | 7/2014 |

OTHER PUBLICATIONS

Mar. 24, 2020 International Search Report Issued on European Patent Application 19211260.

*Primary Examiner* — Olatunji A Godo
(74) *Attorney, Agent, or Firm* — Clements Bernard Walker; Christopher L. Bernard

(57) ABSTRACT

A vehicle battery assembly utilizing side cooling plates. This battery assembly avoids a stacked vertical battery and cooling plate or pack arrangement, optimizes tunnel (and other) space utilization, minimizes battery assembly intrusion into the passenger compartment of the associated vehicle, and allows seat position height to be as low as possible within the passenger compartment of the associated vehicle, while still allowing vertical access to the access points and electrical contacts of the battery modules within the battery assembly. Further, such battery assembly is compatible with conventional and novel cooling pipe configurations and cooling systems.

18 Claims, 8 Drawing Sheets

(51) Int. Cl.
*B60L 50/60* (2019.01)
*B60K 6/28* (2007.10)

(56) References Cited

U.S. PATENT DOCUMENTS

| | | |
|---|---|---|
| 8,893,839 B2 | 11/2014 | Saeki |
| 9,919,591 B2 | 3/2018 | Mizoguchi et al. |
| 10,084,216 B2 | 9/2018 | Iguchi et al. |
| 2011/0212355 A1* | 9/2011 | Essinger ............ H01M 2/1016 |
| | | 429/120 |
| 2013/0025953 A1 | 1/2013 | Saeki |
| 2017/0110773 A1 | 4/2017 | Pucher |
| 2018/0015806 A1 | 1/2018 | Yasuda et al. |
| 2018/0337375 A1 | 11/2018 | Kellner et al. |

\* cited by examiner

VEHICLE BATTERY ASSEMBLY UTILIZING SIDE COOLING PLATES

TECHNICAL FIELD

The present invention relates generally to the automotive field. More specifically, the present invention relates to a vehicle battery assembly utilizing side cooling plates. This vehicle battery assembly finds particular applicability in hybrid and electric vehicles.

BACKGROUND ART

High power battery modules, such as those utilized in hybrid and electric vehicles, require adequate cooling to perform optimally. Typically, these battery modules are space constrained, such as in the tunnel disposed between the seats of the associated vehicle or disposed below the passenger compartment of the associated vehicle. The battery modules are generally disposed on top of one or more cooling plates, packs, or the like. These cooling plates or packs are coupled to one or more cooling pipes that circulate a cooling fluid, such as air, water, coolant, or the like, forming effective heat exchangers. Preferably, the access points and electrical contacts for the battery modules are disposed vertically, for convenient access and so that fluids potentially disposed within the battery modules do not leak out. Disadvantageously, such stacked vertical battery arrangement requires a significant degree of available height, often causing inefficient/undesirable tunnel space utilization and/or intruding into the passenger compartment of the associated vehicle. As a result, tunnel space utilization cannot be optimized, seat position height must be higher than is otherwise desired, etc. Typically, for a variety of safety and design reasons, and depending on the type of vehicle, it is desirable for seat position height to be as low as possible within the passenger compartment of the associated vehicle, for example.

SUMMARY

The vehicle battery assembly described herein utilizes side cooling plates. This battery assembly avoids a stacked vertical battery and cooling plate or pack arrangement, optimizes tunnel (and other) space utilization, minimizes battery assembly intrusion into the passenger compartment of the associated vehicle, and allows seat position height to be as low as possible within the passenger compartment of the associated vehicle, while still allowing vertical access to the access points and electrical contacts of the battery modules within the battery assembly. Further, such battery assembly is compatible with conventional and novel cooling pipe configurations and cooling systems.

The vehicle battery assembly described herein also utilizes stacked or side-by-side battery modules that are surrounded by integrated side cooling plates or packs that provide inherent side crash protection. This saves height and weight, enabling efficient space utilization, allows for quick modularized assembly, and improves side crash safety.

BRIEF DESCRIPTION OF THE DRAWINGS

The present invention is illustrated and described herein with reference to the various drawings, in which like reference numbers are used to denote like assembly components/method steps, as appropriate, and in which.

DESCRIPTION OF EMBODIMENTS

In general, the vehicle battery assembly utilizes side cooling plates. This battery assembly avoids a stacked vertical battery and cooling plate or pack arrangement, optimizes tunnel (and other) space utilization, minimizes battery assembly intrusion into the passenger compartment of the associated vehicle, and allows seat position height to be as low as possible within the passenger compartment of the associated vehicle, while still allowing vertical access to the access points and electrical contacts of the battery modules within the battery assembly. Further, such battery assembly is compatible with conventional and novel cooling pipe configurations and cooling systems.

Figure 1:
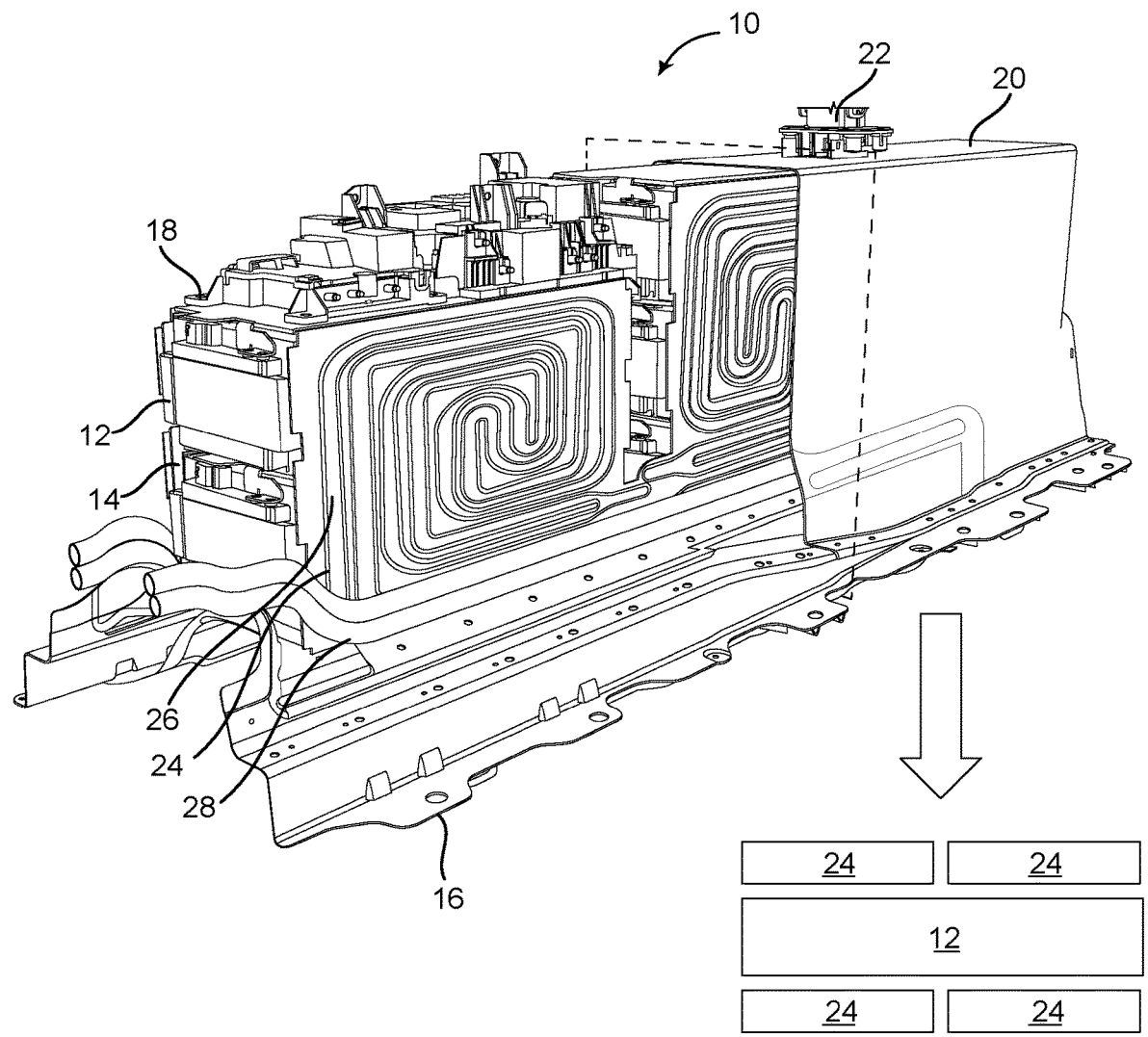
FIG. 1 is a perspective view of one exemplary embodiment of the vehicle battery assembly, including a partial cut-away view of an associated tunnel housing.

Referring now specifically to FIG. 1, in one exemplary embodiment, the vehicle battery assembly 10 includes one or more battery modules 12 that are arranged in a stacked and/or side-by-side configuration. As used herein, "battery module" refers generically to a single battery or stacks or collections of battery modules, cells, or units. Preferably, the one or more battery modules 12 are disposed in a support structure 14 that retains the one or more battery modules 12 and holds them in rigid alignment. Alternatively, the one or more battery modules 12 can simply be coupled together using appropriate connectors. The one or more battery modules 12 can be one or more prismatic (i.e., rectangular) battery modules, one or more pouch battery modules, etc., all well known to those of ordinary skill in the art, suitable for retaining a charge and powering one or more electrical components 102 (FIG. 6) to which they are ultimately coupled, such as an electric motor, electronic control components, electric actuators, etc. In this exemplary embodiment, the one or more battery modules 12 are secured to the chassis and/or frame 16 of a vehicle 100 (FIG. 6) in a tunnel between the seats 104 (FIG. 6) of the vehicle 100, as illustrated, or beneath or in a lower portion of the passenger compartment of the vehicle 100, such as below the seats 104 of the vehicle 100. The one or more battery modules 12 include one or more access points (not illustrated) and/or electrical contacts 18 disposed at a top portion thereof, whereby the one or more battery modules 12 are ultimately coupled to the one or more electrical components 102.

A housing 20, such as the integral tunnel housing or a separate component, is disposed about all or a portion of the one or more battery modules 12 and serves to protect the one or more battery modules 12 and isolate them from the passenger compartment and other structures of the vehicle 100. Optionally, this housing 20 is selectively removable and/or includes one or more access ports (not illustrated) by which the one or more battery modules 12 can be accessed by a vehicle user or technician. The housing 20 can also include a consolidated electrical connector 22 that is coupled to the electrical contacts 18 of each of the one or more battery modules 12.

In most applications, the battery assembly 10 includes a stacked and/or side-by-side arrangement of a plurality of battery modules 12 that is disposed in the tunnel disposed between the seats 104 of the vehicle 100 or beneath or in a lower portion of the passenger compartment of the vehicle 100, such as below the seats 104 of the vehicle 100. This necessarily affects space utilization and/or the seat position height utilized in the passenger compartment of the vehicle 100, which it is typically desirable to optimize and/or minimize.

The battery assembly 10 also includes one or more cooling plates (or packs) 24 that are disposed along the lateral sides and/or transverse ends of the one or more battery modules 12 collectively, as opposed to on top of or beneath the one or more battery modules 12, as is conventional. The one or more cooling plates 24 are preferably disposed within the housing 20 with the one or more battery modules 12. Each of the one or more cooling plates 24 represents a planar heat exchanger made of a metallic (e.g., aluminum) or other suitable thermally conductive material. Each of the one or more cooling plates 24 incorporates and/or defines one or more conduits 26 that are configured and arranged to carry a cooling fluid, such as air, water, coolant, or the like, in proximity to the one or more battery modules 12. In the exemplary embodiment illustrated, the one or more conduits 26 are arranged in a concentric pattern, although it will be readily apparent to those of ordinary skill in the art that a vertical, horizontal, diagonal, and/or other pattern could also be utilized. Collectively, the one or more cooling plates 24 and the one or more conduits 26 are operable for removing heat from the one or more battery modules 12 and the cooling fluid is operable for cooling the one or more battery modules 12. The cooling fluid is obtained from and delivered to the one or more conduits 26 via one or more cooling pipes 28 that are routed through the housing 20 and into the battery assembly 10.

In the exemplary embodiment illustrated, a plurality of cooling plates 24 are disposed in a side-by-side configuration on either lateral side of the one or more battery modules 12. This configuration maximizes the cooling area provided by the cooling plates 24 to the one or more battery modules 12. The cooling plates 24 could also be disposed in a stacked vertical configuration, on either transverse end of the one or more battery modules 12, on only one lateral side of the one or more battery modules 12, etc. Further, the one or more cooling pipes 28 can be coupled to the plurality of cooling plates 24 and the one or more conduits 26 in parallel. Alternatively, the one or more cooling plates 24 and the one or more conduits 26 can be daisy-chained together in series. In practice, the parallel arrangement is more complex, but provides enhanced cooling performance, while the series arrangement is less complex, but provides diminished cooling performance, as the last cooling plate 24 is hotter than the first cooling plate 24, which is not preferred for cooling performance.

Advantageously, this battery assembly 10 avoids a stacked vertical battery module 12 and cooling plate (or pack) 24 arrangement, optimizes tunnel (and other) space utilization, minimizes battery assembly 10 intrusion into the passenger compartment of the vehicle 100, and/or allows seat position height to be as low as possible within the passenger compartment of the vehicle 100, while still allowing vertical access to the access points and electrical contacts 18 of the battery modules 12 within the battery assembly 10. Further, such battery assembly 10 is compatible with conventional and novel cooling pipe 28 configurations and cooling systems, in general.

Figure 2:
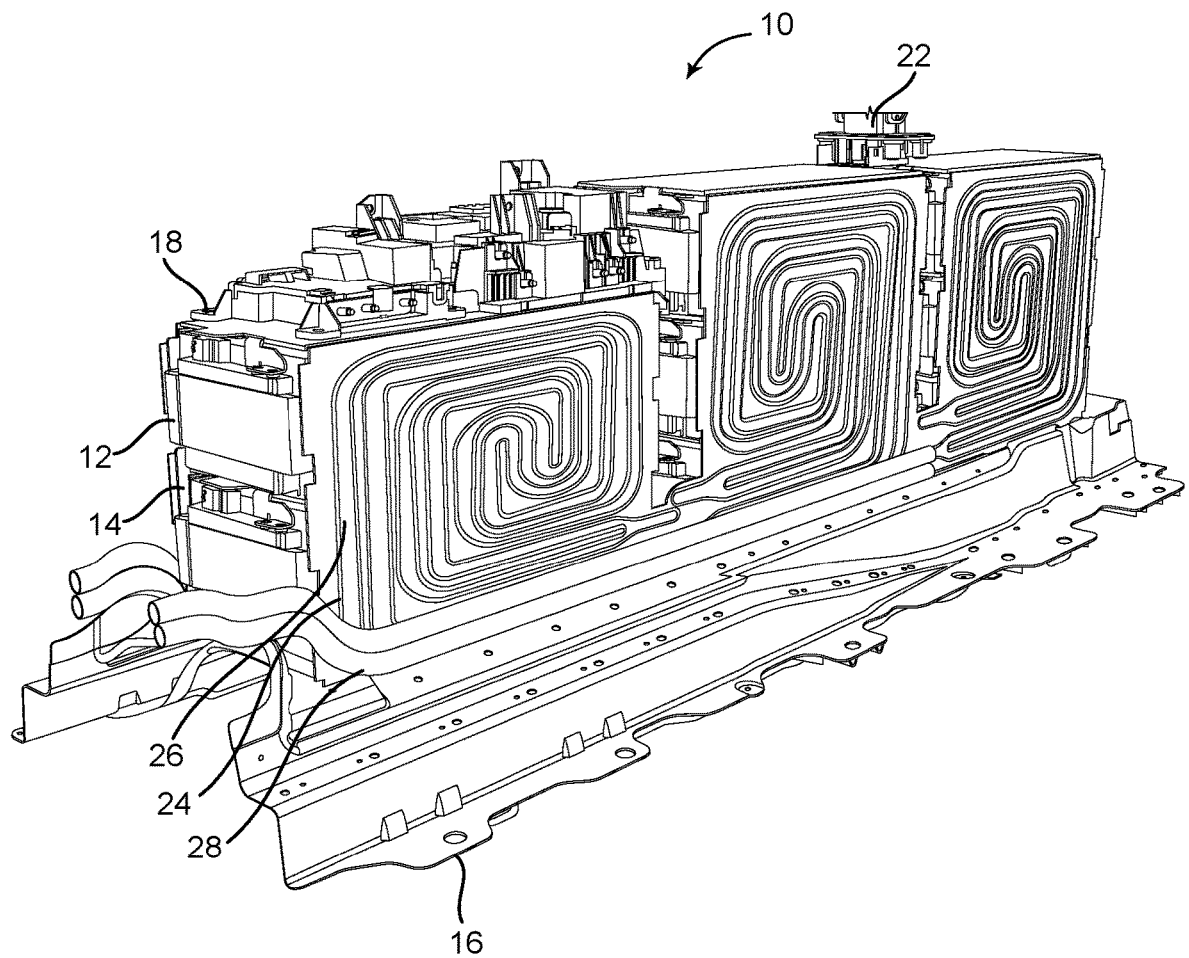
FIG. 2 is another perspective view of the vehicle battery assembly of FIG. 1 with the associated tunnel housing removed.

FIG. 2 is another perspective view of the battery assembly 10 of FIG. 1 with the associated tunnel housing 20 (FIG. 1) removed. Again, the vehicle battery assembly 10 includes one or more battery modules (i.e., cells, modules, or including one or more cells or modules) 12 that are arranged in a stacked and/or side-by-side configuration. Preferably, the one or more battery modules 12 are disposed in a support structure 14 that retains the one or more battery modules 12 and holds them in rigid alignment. The one or more battery modules 12 can be one or more prismatic (i.e., rectangular) battery modules/modules/cells, one or more pouch battery modules/modules/cells, etc., all well known to those of ordinary skill in the art, suitable for retaining a charge and powering one or more electrical components 102 (FIG. 6) to which they are ultimately coupled, such as an electric motor, electronic control components, electric actuators, etc. In this exemplary embodiment, the one or more battery modules 12 are secured to the chassis and/or frame 16 of a vehicle 100 (FIG. 6) in a tunnel between the seats 104 (FIG. 6) of the vehicle 100, as illustrated, or beneath or in a lower portion of the passenger compartment of the vehicle 100, such as below the seats 104 of the vehicle 100. The one or more battery modules 12 include one or more access points (not illustrated) and/or electrical contacts 18 disposed at a top portion thereof, whereby the one or more battery modules 12 are ultimately coupled to the one or more electrical components 102. The housing 20 and/or the support structure 14 can include a consolidated electrical connector 22 that is coupled to the electrical contacts 18 of each of the one or more battery modules 12.

The battery assembly 10 also includes one or more cooling plates (or packs) 24 that are disposed along the lateral sides and/or transverse ends of the one or more battery modules 12 collectively, as opposed to on top of or beneath the one or more battery modules 12, as is conventional. The one or more cooling plates 24 are preferably disposed within the housing 20. Each of the one or more cooling plates 24 represents a planar heat exchanger made of a metallic (e.g., aluminum) or other suitable thermally conductive material. Each of the one or more cooling plates 24 incorporates and/or defines one or more conduits 26 that are configured and arranged to carry a cooling fluid, such as air, water, coolant, or the like, in proximity to the one or more battery modules 12. In the exemplary embodiment illustrated, the one or more conduits 26 are arranged in a concentric pattern, although it will be readily apparent to those of ordinary skill in the art that a vertical, horizontal, diagonal, and/or other pattern could also be utilized. Collectively, the one or more cooling plates 24 and the one or more conduits 26 are operable for removing heat from the one or more battery modules 12 and the cooling fluid is operable for cooling the one or more battery modules 12.

The cooling fluid is obtained from and delivered to the one or more conduits 26 via one or more cooling pipes 28 that are routed through the housing 20 and into the battery assembly 10. In the exemplary embodiment illustrated, a plurality of (e.g., three) cooling plates 24 are disposed in a side-by-side configuration on either lateral side of the one or more battery modules 12. This configuration maximizes the cooling area provided by the cooling plates 24 to the one or more battery modules 12. The cooling plates 24 could also be disposed in a stacked vertical configuration, on either transverse end of the one or more battery modules 12, on only one lateral side of the one or more battery modules 12, etc. Further, the one or more cooling pipes 28 can be coupled to the plurality of cooling plates 24 and the one or more conduits 26 in parallel. Alternatively, the one or more cooling plates 24 and the one or more conduits 26 can be daisy-chained together in series. In practice, the parallel arrangement is more complex, but provides enhanced cooling performance, while the series arrangement is less complex, but provides diminished cooling performance.

Figure 3:
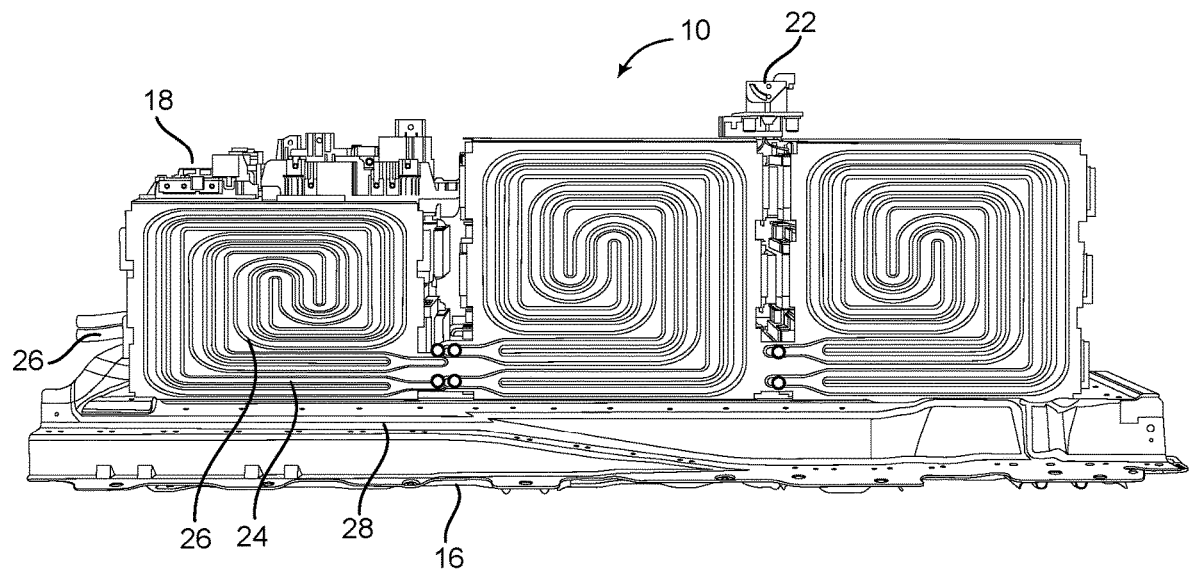
FIG. 3 is a planar side view of the vehicle battery assembly of FIGS. 1 and 2 again with the associated tunnel housing removed.

FIG. 3 is a planar side view of the battery assembly 10 of FIGS. 1 and 2 again with the associated tunnel housing 20 (FIG. 1) removed. Again, the vehicle battery assembly 10 includes one or more battery modules (i.e., cells, modules, or including one or more cells or modules) 12 that are arranged in a stacked and/or side-by-side configuration. Preferably, the one or more battery modules 12 are disposed in a support structure 14 that retains the one or more battery modules 12 and holds them in rigid alignment. The one or more battery modules 12 can be one or more prismatic (i.e., rectangular) battery modules/modules/cells, one or more pouch battery modules/modules/cells, etc., all well known to those of ordinary skill in the art, suitable for retaining a charge and powering one or more electrical components 102 (FIG. 6) to which they are ultimately coupled, such as an electric motor, electronic control components, electric actuators, etc. In this exemplary embodiment, the one or more battery modules 12 are secured to the chassis and/or frame 16 of a vehicle 100 (FIG. 6) in a tunnel between the seats 104 (FIG. 6) of the vehicle 100, as illustrated, or beneath or in a lower portion of the passenger compartment of the vehicle 100, such as below the seats 104 of the vehicle 100. The one or more battery modules 12 include one or more access points (not illustrated) and/or electrical contacts 18 disposed at a top portion thereof, whereby the one or more battery modules 12 are ultimately coupled to the one or more electrical components 102. The housing 20 and/or the support structure 14 can include a consolidated electrical connector 22 that is coupled to the electrical contacts 18 of each of the one or more battery modules 12.

The battery assembly 10 also includes one or more cooling plates (or packs) 24 that are disposed along the lateral sides and/or transverse ends of the one or more battery modules 12 collectively, as opposed to on top of or beneath the one or more battery modules 12, as is conventional. The one or more cooling plates 24 are preferably disposed within the housing 20. Each of the one or more cooling plates 24 represents a planar heat exchanger made of a metallic (e.g., aluminum) or other suitable thermally conductive material. Each of the one or more cooling plates 24 incorporates and/or defines one or more conduits 26 that are configured and arranged to carry a cooling fluid, such as air, water, coolant, or the like, in proximity to the one or more battery modules 12. In the exemplary embodiment illustrated, the one or more conduits 26 are arranged in a concentric pattern, although it will be readily apparent to those of ordinary skill in the art that a vertical, horizontal, diagonal, and/or other pattern could also be utilized. Collectively, the one or more cooling plates 24 and the one or more conduits 26 are operable for removing heat from the one or more battery modules 12 and the cooling fluid is operable for cooling the one or more battery modules 12. The cooling fluid is obtained from and delivered to the one or more conduits 26 via one or more cooling pipes 28 that are routed through the housing 20 and into the battery assembly 10. In the exemplary embodiment illustrated, a plurality of (e.g., three) cooling plates 24 are disposed in a side-by-side configuration on either lateral side of the one or more battery modules 12. This configuration maximizes the cooling area provided by the cooling plates 24 to the one or more battery modules 12. The cooling plates 24 could also be disposed in a stacked vertical configuration, on either transverse end of the one or more battery modules 12, on only one lateral side of the one or more battery modules 12, etc. Further, the one or more cooling pipes 28 can be coupled to the plurality of cooling plates 24 and the one or more conduits 26 in parallel. Alternatively, the one or more cooling plates 24 and the one or more conduits 26 can be daisy-chained together in series. In practice, the parallel arrangement is more complex, but provides enhanced cooling performance, while the series arrangement is less complex, but provides diminished cooling performance.

Figure 4:
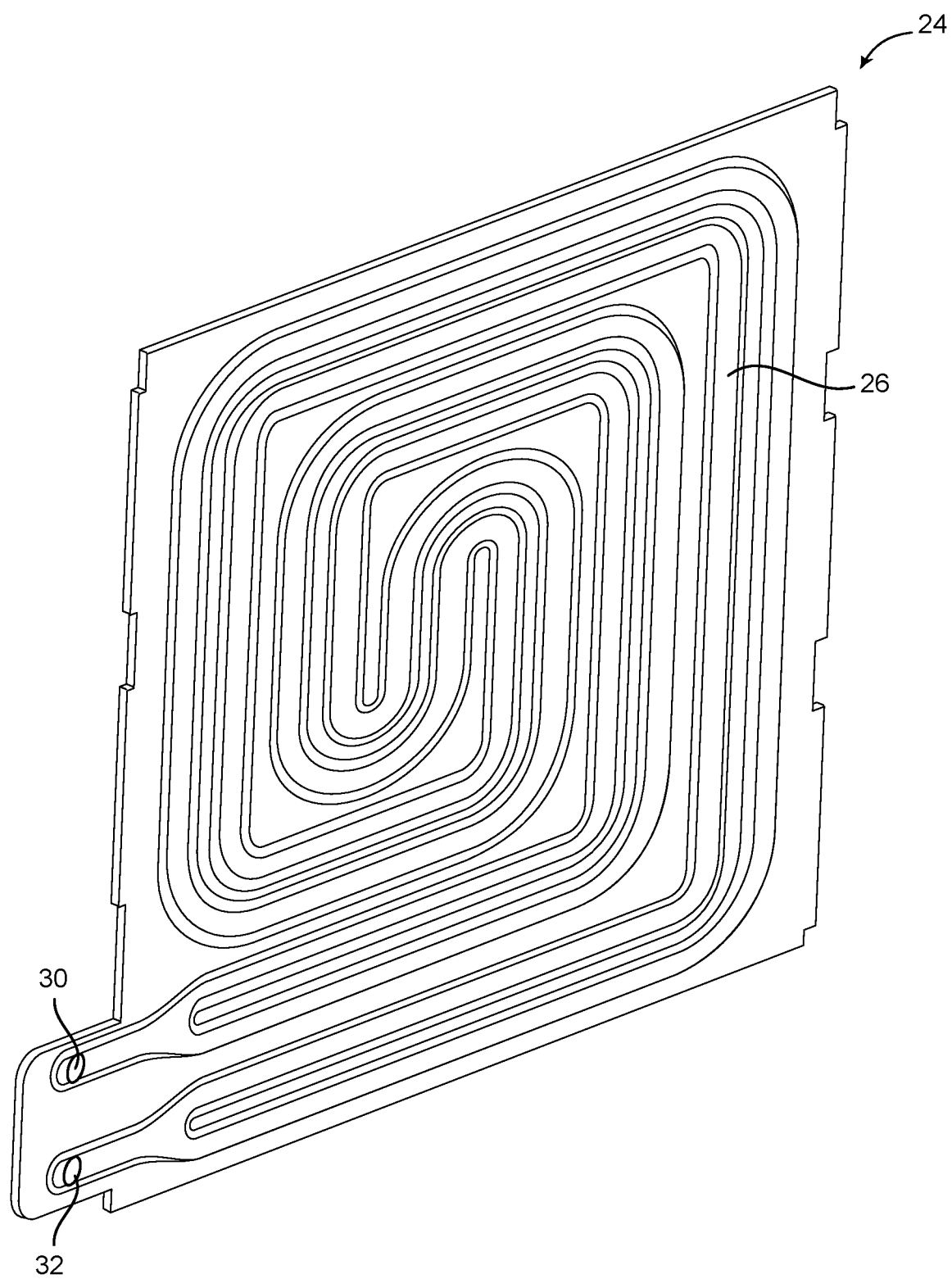
FIG. 4 is a perspective view of one exemplary embodiment of a cooling plate used in conjunction with the vehicle battery assembly of FIGS. 1-3.

FIG. 4 is a perspective view of one exemplary embodiment of a cooling plate 24 used in conjunction with the battery assembly 10 of FIGS. 1-3. Optionally, the one or conduits 26 consist of hollow tubing that is secured to the planar structure of the associated cooling plate 24. Alternatively, the one or more conduits 26 consist of hollow stamped or pressed channels that are formed between adjacent planar layers of the associated cooling plate 24, for example. It will be readily apparent to those of ordinary skill in the art that the one or more conduits 26 can be formed by other means equally, provided that the one or more conduits 26 are fluidly sealed and capable of circulating the cooling fluid. In the case that air is used as the cooling fluid, the one or more conduits 26 can be replaced with one or more cooling channels, fins, or the like. In the case that water or coolant is used as the cooling fluid, each of the one or more conduits 26 preferably includes an inlet port 30 and an outlet port 32 both coupled to the cooling pipe 28.

Figure 5:
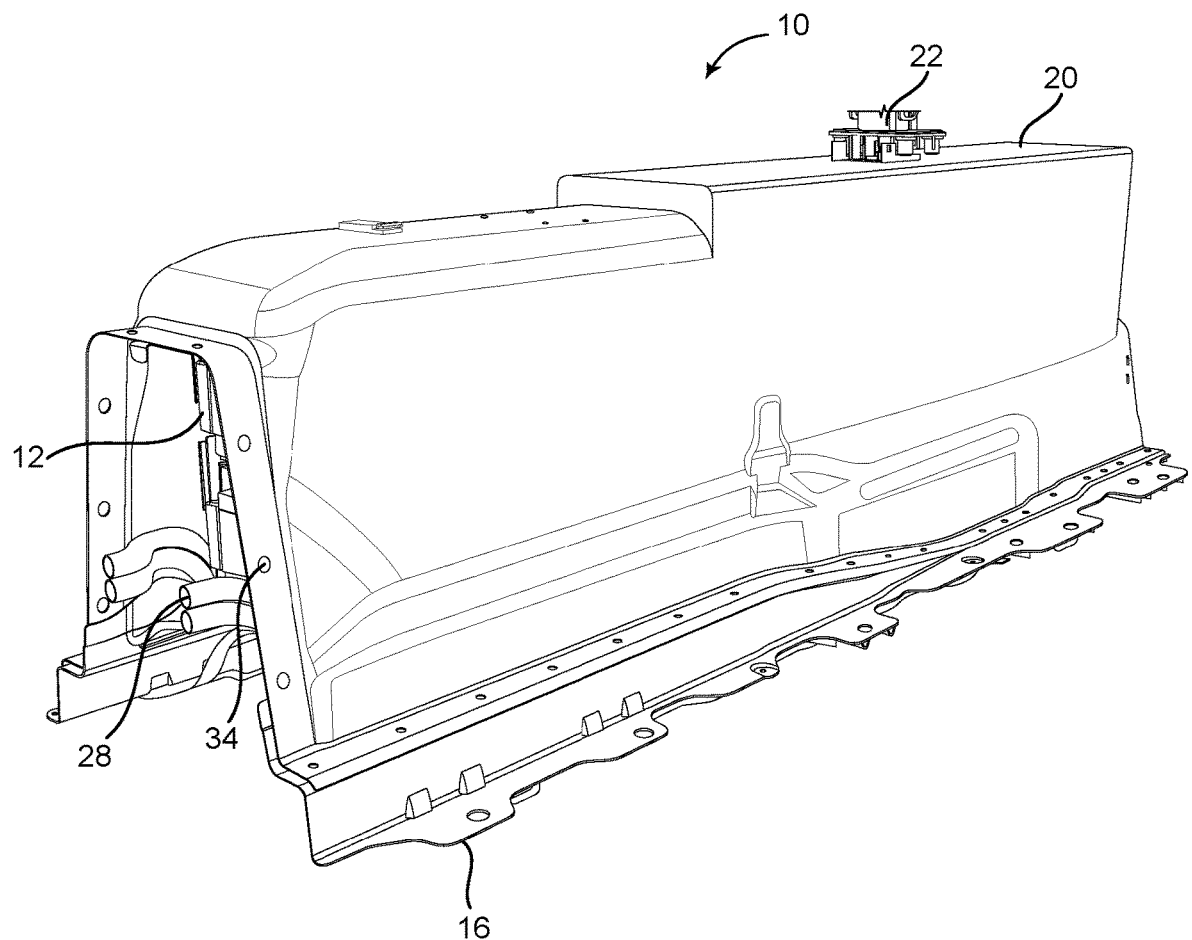
FIG. 5 is a further perspective view of the vehicle battery assembly of FIGS. 1-3, including the associated tunnel housing.

FIG. 5 is a further perspective view of the battery assembly 10 of FIGS. 1-3, including the associated tunnel housing 20. In this exemplary embodiment, the tunnel housing 20 includes a plurality of attachment points 34 disposed along an edge thereof by which the tunnel housing 20 is secured to the chassis and/or frame 16 (and/or other structures) of the vehicle 100 (FIG. 6), with routing access for the one or more cooling pipes 28. In this exemplary embodiment, the tunnel housing 20 consists of an inverted U-shaped cowling or the like having one or more open end portions, formed or molded to accommodate and substantially conform to the structures disposed therein. It will be readily apparent to those of ordinary skill in the art that the battery assembly 10 can be used in any space in which its side-by-side battery-cooling plate configuration is desirable, for space saving/optimization purposes. Thus, use is not limited to tunnel and passenger compartment applications.

Figure 6:
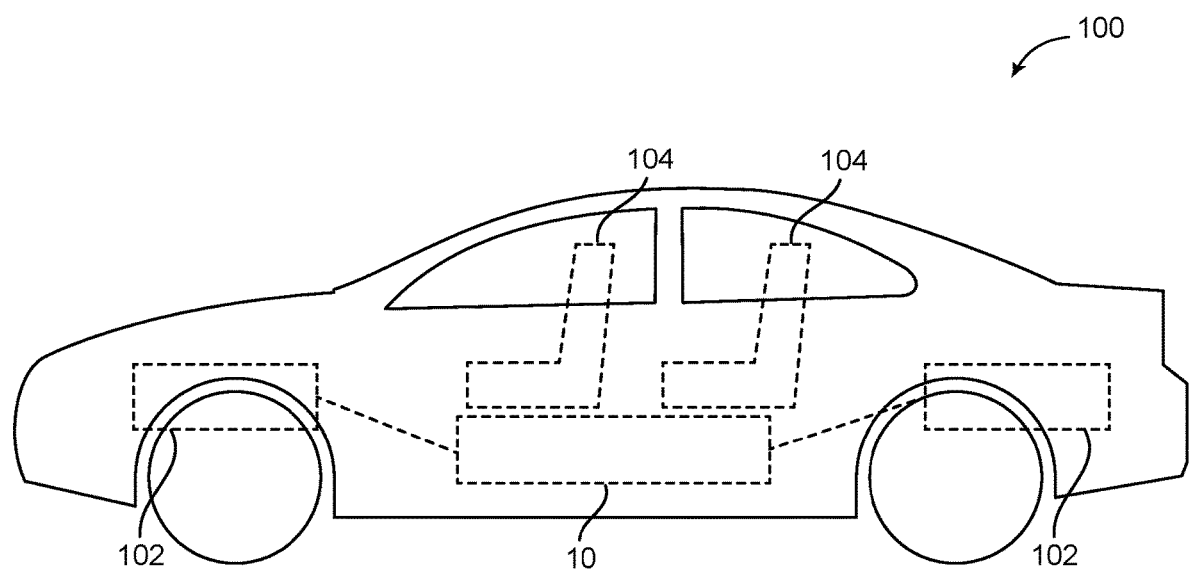
FIG. 6 is a schematic diagram illustrating a vehicle utilizing the vehicle battery assembly of FIGS. 1-3 and 5.

FIG. 6 is a schematic diagram illustrating a vehicle 100 utilizing the vehicle battery assembly 10 of FIGS. 1-3 and 5. The battery assembly 10 powers one or more electrical components 102 to which it is ultimately coupled, such as an electric motor, electronic control components, electric actuators, etc. The battery assembly 10 is secured to the chassis and/or frame 16 (FIGS. 1-3 and 5) of the vehicle 100 in the tunnel of the vehicle 100 and/or beneath or in a lower portion of the passenger compartment of the vehicle 100, such as below the seats 104 of the vehicle 100. Advantageously, the battery assembly 10 avoids a stacked vertical battery module 12 (FIGS. 1, 2, and 5) and cooling plate (or pack) 24 (FIGS. 1-4) arrangement, optimizes tunnel (and other) space utilization, minimizes battery assembly 10 intrusion into the passenger compartment of the vehicle 100, and/or allows seat position height to be as low as possible within the passenger compartment of the vehicle 100, while still allowing vertical access to the access points and electrical contacts 18 (FIGS. 1-3) of the battery modules 12 within the battery assembly 10. Further, such battery assembly 10 is compatible with conventional and novel cooling pipe 28 (FIGS. 1-3 and 5) configurations and cooling systems, in general.

Figure 7:
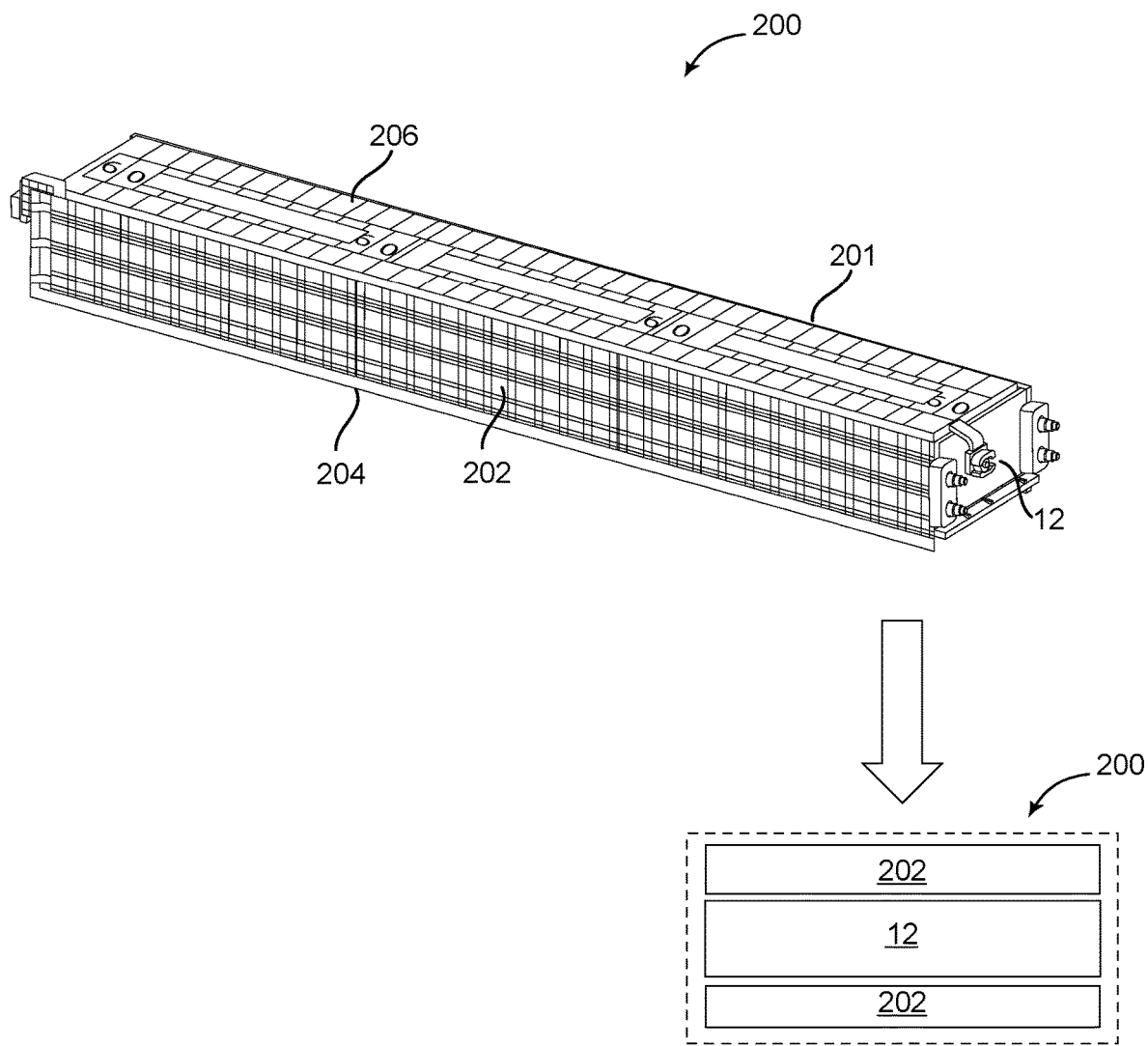
FIG. 7 is a perspective view of another exemplary modular embodiment of the vehicle battery assembly, utilizing integrated side cooling plates that provide side impact protection for the associated battery module and are easily stackable or arrangeable in a side-by-side configuration.
Figure 8:
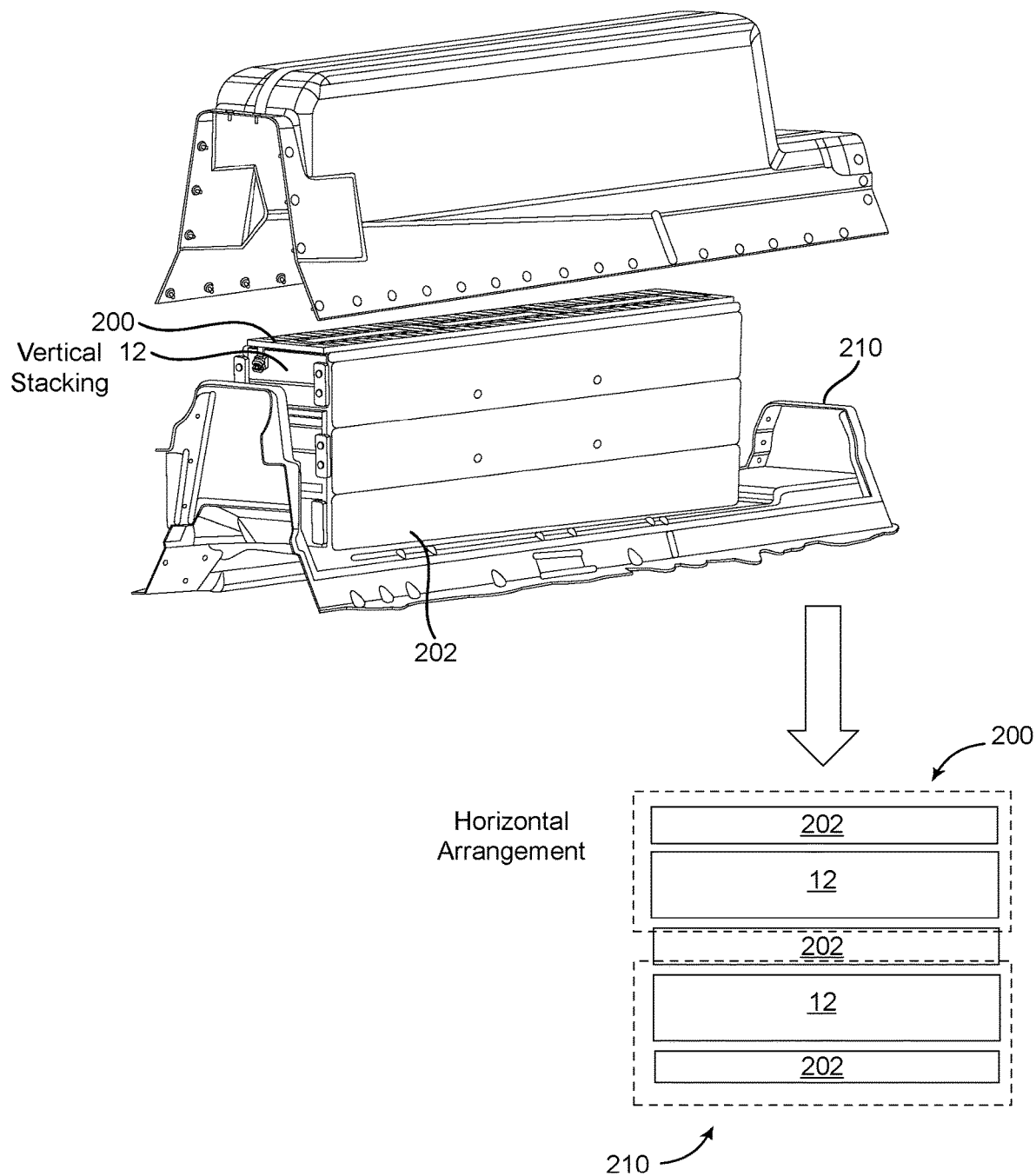
FIG. 8 is a perspective view of the modularized vehicle battery assembly of FIG. 7, highlighting both a vertical stacked tunnel implementation and a horizontal arrangement.

FIG. 7 illustrates an integrated battery module 200 that can be stacked or arranged in a side-by-side manner to form a modularized battery assembly 210 (FIG. 8). The integrated battery module 200 includes a battery module 12 made up of one or more individual batteries, packs, or cells arranged in a row, stack, or other group. The battery module 12 is surrounded by a housing structure 201 that includes reinforced cooling plates 202 disposed along the sides (and, optionally, the ends) thereof. These reinforced cooling plates 202 are formed from one or more layers of an extruded aluminum material or the like that collectively define the cooling channels 26. The cooling channels 26, along with one or more optional stiffening members, impart the reinforced cooling plates 202 with a degree of rigidity that adequately protects the battery module 12 from side impact forces. The bottom portion of the housing structure 201 is formed from a steel plate 204 or the like that provides the integrated battery module 200 with a degree of structural integrity and internal fire resistance. The top portion of the housing structure 201 is formed from a rigid plate or planar support structures 206 that also provide the integrated battery module 200 with a degree of structural integrity. Thus, the reinforced cooling plates 202, steel plate 204, and rigid plate or planar support structures 206 form a protective box or cage around the battery module 12.

As illustrated in FIG. 8, the integrated battery modules 200 can be stacked or arranged in a side-by-side configuration to form the modularized battery assembly 210. The steel plate 204 and rigid plate or planar support structures 206 can incorporate appropriate holes, connectors, mechanisms for coupling the integrated battery modules 200 together and/or to the vehicle 100 (FIG. 6), whether in the tunnel, under the passenger compartment, etc. In the event that the integrated battery modules 200 are arranged in a side-by-side configuration, only a single reinforced cooling plate 202 likely needs to be used between adjacent battery modules 12 to provide adequate cooling.

Again, this modularized battery assembly avoids a stacked vertical battery and cooling plate or pack arrangement, optimizes tunnel (and other) space utilization, minimizes battery assembly intrusion into the passenger compartment of the associated vehicle, and allows seat position height to be as low as possible within the passenger compartment of the associated vehicle, while still allowing vertical access to the access points and electrical contacts of the battery modules within the battery assembly. Further, such battery assembly is compatible with conventional and novel cooling pipe configurations and cooling systems. In this case, the modularized battery assembly is quicker to assemble as the cooling plates are integrated with the battery modules in units that are easy to coupled together.

Although the present invention is illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention, are contemplated thereby, and are intended to be covered by the following non-limiting claims for all purposes.

The invention claimed is:

1. A vehicle battery assembly, comprising:
   a battery module having a top surface, a bottom surface, a plurality of lateral side surfaces, and a plurality of transverse end surfaces; and
   at least one cooling plate adapted to circulate a cooling fluid disposed adjacent to at least one of the plurality of lateral side surfaces and the plurality of transverse end surfaces of the battery module;
   wherein the bottom surface of the battery module is adapted to be disposed adjacent to a chassis of a vehicle without a cooling plate disposed there between.

2. The vehicle battery assembly of claim 1, wherein the at least one cooling plate comprises a plurality of cooling plates adapted to circulate the cooling fluid disposed adjacent to the at least one of the plurality of lateral side surfaces and the plurality of transverse end surfaces of the battery module.

3. The vehicle battery assembly of claim 1, wherein the at least one cooling plate comprises at least one cooling plate adapted to circulate the cooling fluid disposed adjacent to at least one of each opposed lateral side surface and each opposed transverse end surface of the battery module.

4. The vehicle battery assembly of claim 1, further comprising one or more cooling pipes adapted to circulate the cooling fluid coupled to the at least one cooling plate.

5. The vehicle battery assembly of claim 1, wherein the at least one cooling plate comprises one or more conduits adapted to circulate the cooling fluid about the cooling plate and collect and remove heat from the battery module.

6. The vehicle battery assembly of claim 1, wherein the battery module and the at least one cooling plate are arranged in a side-by-side configuration and configured to be disposed in a tunnel space disposed between seats of a vehicle.

7. The vehicle battery assembly of claim 1, wherein the battery module and the at least one cooling plate are arranged in a side-by-side configuration and configured to be disposed in or adjacent to a passenger compartment space disposed beneath seats of a vehicle.

8. An integrated battery module for use in a vehicle battery assembly, the integrated battery module comprising:
   a battery module having a top surface, a bottom surface, and a plurality of side surfaces;
   at least one reinforced side cooling plate adapted to circulate a cooling fluid disposed adjacent to at least one of the plurality of side surfaces of the battery module;
   a rigid bottom plate disposed adjacent to the bottom surface of the battery module and coupled to the at least one reinforced side cooling plate; and
   one or more rigid planar top structures disposed adjacent to the top surface of the battery module and coupled to the at least one reinforced side cooling plate;
   wherein the bottom surface of the battery module is adapted to be disposed adjacent to the rigid bottom plate and a chassis of a vehicle without a cooling plate disposed there between.

9. The integrated battery module of claim 8, wherein the at least one reinforced side cooling plate, the bottom plate, and the one or more rigid planar top structures form a rigid, stackable housing structure around the battery module.

10. The integrated battery module of claim 8, wherein the at least one reinforced side cooling plate defines one or more cooling channels adapted to circulate the cooling fluid and provide the at least one reinforced side cooling plate with rigidity.

11. The integrated battery module of claim 8, wherein the at least one reinforced side cooling plate comprises one or more structural reinforcement members adapted to provide the at least one reinforced side cooling plate with rigidity.

12. A vehicle, comprising:
one or more electric components; and
a vehicle battery assembly coupled to the one or more electric components, the vehicle battery assembly comprising:
a battery module having a top surface, a bottom surface, a plurality of lateral side surfaces, and a plurality of transverse end surfaces; and
at least one cooling plate adapted to circulate a cooling fluid disposed adjacent to at least one of the plurality of lateral side surfaces and the plurality of transverse end surfaces of the battery module;
wherein the bottom surface of the battery module is adapted to be disposed adjacent to a chassis of the vehicle without a cooling plate disposed there between.

13. The vehicle of claim 12, wherein the at least one cooling plate comprises a plurality of cooling plates adapted to circulate the cooling fluid disposed adjacent to the at least one of the plurality of lateral side surfaces and the plurality of transverse end surfaces of the battery module.

14. The vehicle of claim 12, wherein the at least one cooling plate comprises at least one cooling plate adapted to circulate the cooling fluid disposed adjacent to at least one of each opposed lateral side surface and each opposed transverse end surface of the battery module.

15. The vehicle of claim 12, further comprising one or more cooling pipes adapted to circulate the cooling fluid coupled to the at least one cooling plate.

16. The vehicle of claim 12, wherein the at least one cooling plate comprises one or more conduits adapted to circulate the cooling fluid about the cooling plate and collect and remove heat from the battery module.

17. The vehicle of claim 12, wherein the battery module and the at least one cooling plate are arranged in a side-by-side configuration and configured to be disposed in a tunnel space disposed between seats of the vehicle.

18. The vehicle of claim 12, wherein the battery module and the at least one cooling plate are arranged in a side-by-side configuration and configured to be disposed in or adjacent to a passenger compartment space disposed beneath seats of the vehicle.

* * * * *